United States Patent
Kindle

[15] 3,666,135
[45] May 30, 1972

[54] VERTICAL HEATING VESSEL WITH A BURNER DISPOSED ON ITS UPPER SIDE

[72] Inventor: Edwin Kindle, Schaan, Liechtenstein

[73] Assignee: Gustav Ospelt Hovalwerk A.G., Vaduz, Liechtenstein

[22] Filed: Oct. 29, 1970

[21] Appl. No.: 84,999

[30] Foreign Application Priority Data

Nov. 4, 1969 Luxembourg............................59.742

[52] U.S. Cl. ........................220/36, 110/173 R, 220/30.5
[51] Int. Cl.............................................................B65d 43/26
[58] Field of Search .....................110/173 R, 179; 126/25 C; 220/30.5, 36

[56] References Cited

UNITED STATES PATENTS

| | | | |
|---|---|---|---|
| 2,423,909 | 7/1947 | Smith | 220/30.5 X |
| 2,870,934 | 1/1959 | Hill | 220/30.5 X |
| 3,311,255 | 3/1967 | Loveless | 220/30.5 X |

FOREIGN PATENTS OR APPLICATIONS

| | | | |
|---|---|---|---|
| 137,349 | 9/1952 | Sweden | 220/30.5 |
| 354,997 | 7/1961 | Switzerland | 220/36 |

Primary Examiner—M. Henson Wood, Jr.
Assistant Examiner—Edwin D. Grant
Attorney—Ernest G. Montague

[57] ABSTRACT

A heating vessel with a vertical, substantially cylindrically shaped water jacket, which comprises a cover arranged on the upper side of the water jacket and adapted to carry a burner projecting into a combination chamber surrounded by the water jacket. A vertical crank-like rod carries the cover pivotally about a first vertical axis at the upper end of the rod. A support means is arranged on the outer side of the heating vessel bearing at its lower end the crank-like rod swingably about a second vertical axis and displaceably in the direction of the second vertical axis. An eccentric lever lifts the crank-like rod by cooperation between the lower end of the rod and the eccentric lever in the support means. The eccentric lever has a curved path, and the latter has a plane face supporting the crank-like rod in its lifted position.

1 Claims, 4 Drawing Figures

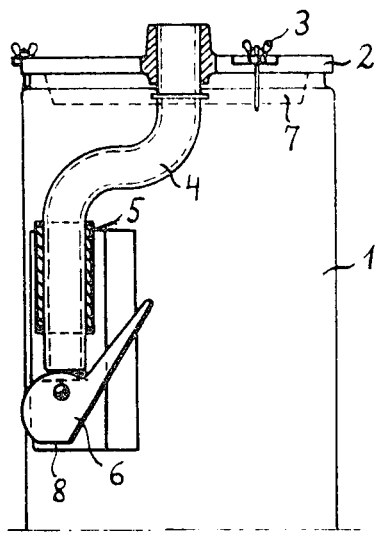
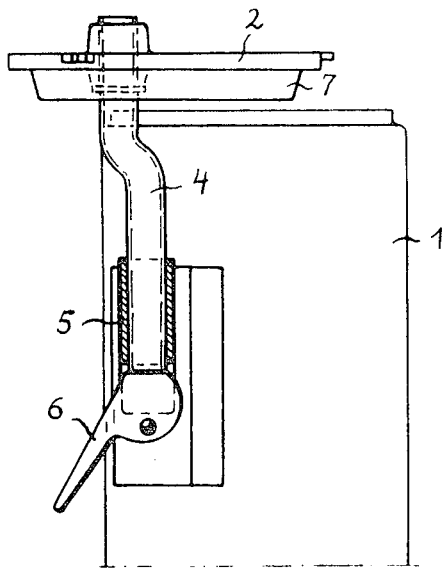
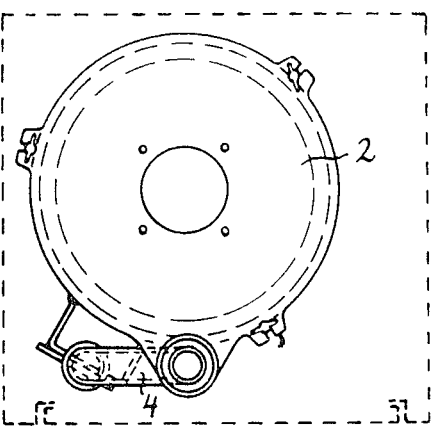
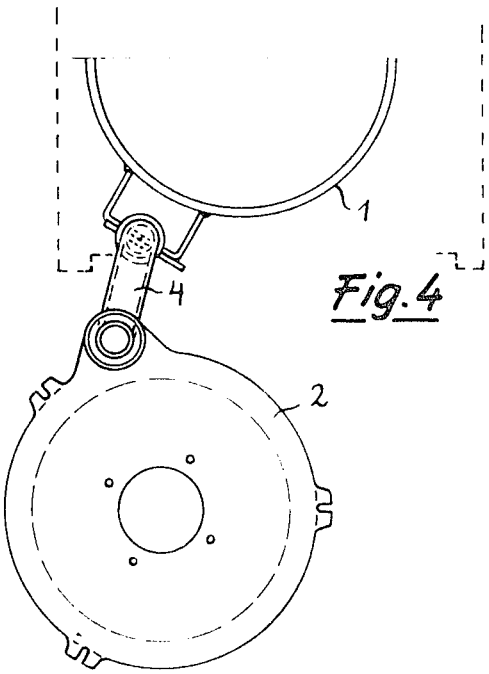

VERTICAL HEATING VESSEL WITH A BURNER DISPOSED ON ITS UPPER SIDE

The present invention relates to a heating vessel with a vertical, substantially cylindrically shaped, water jacket and a cover provided on its upper side and carrying a burner projecting from above into a combustion chamber surrounded by the water jacket.

At heating vessels of the type mentioned above, the cover closing the combustion chamber at the upper end side of the heating vessel must be removable to provide free access from above into the combustion chamber and to the vessel flues and a cleaning of the heating vessel mechanically with brushes or the like can easily be carried out. Since the cover projects into the combustion chamber with a ceramic heat shield arranged on its inner side and since the burner projects with its burner-tube through the cover up into the burner chamber, it is connected with considerable effort and difficulties to lift the cover with the heavy burner after loosening the cover set screws and to remove it over the upper edge of the vessel from the upper face of the heating vessel. This manual labor becomes problematic, in particular, if the heating vessel with the burner is arranged in a compact and narrow vessel housing and therefore accessibility is very limited.

It is therefore one object of the present invention to provide a heating vessel of the type described above which avoids the above-mentioned complications and difficulties.

It is another object of the invention to provide a heating vessel wherein the cover is borne pivotally about a vertical axis on the upper end of a vertically arranged cranked rod, wherein the lower end of said cranked rod is borne in a support means arranged on the outer side of the heating vessel swingably about a vertical axis and displaceably in the direction of said axis and wherein said cranked rod is liftable in said support means by an eccentric lever cooperating with said lower end of said cranked rod the curved path of said eccentric lever shows a plane face on which said cranked rod rests in its lifted position.

With these and other objects in view, which will become evident in the following detailed description, the present invention will be clearly understood in connection with the accompanying drawings, in which the invention is disclosed by example only, and in which:

FIG. 1 is a side elevation of a heating vessel in its closed state, and in accordance with state; invention;

FIG. 2 is a side elevation of the heating vessel shown in FIG. 1 in its opened state;

FIG. 3 is a top plan view of the heating vessel shown in FIG. 1; and

FIG. 4 is a top plan view of the heating vessel shown in FIG. 2.

Referring now to the drawings designed in accordance with the present invention, the heating vessel as shown in FIG. 1 comprises a vertical, cylindrically shaped water jacket 1 surrounding a combustion chamber arranged in the upper part of said heating vessel. The combustion chamber is closed by a cover 2 provided on the upper side of the heating vessel, which cover 2 is screwed sealingly to and removably from the heating vessel by means of screws 3 and which carries a burner (not shown), which burner opens up through the cover 2 into said combustion chamber, burning with a so-called "falling flame". The cover 2 is borne pivotally about a vertical axis at the upper end of a crank-like rod 4. The lower end of the cranked rod 4 is borne in a support means 5 attached to the outer side of the heating vessel, and in particular swingably about a vertical axis and displaceably in the direction of this axis. Below the lower end of the cranked rod 4 an eccentric lever 6 is arranged on the support means 5, by means of which lever 6 the cranked rod 4 can be lifted in the support means 5. In the closed state of the heating vessel shown in FIGS. 1 and 3, the cover 2 projects with a heat shield 7 provided on its inner side into the combustion chamber of the heating vessel. In the same manner the burner projects with its burner tube through the cover 2 into the combustion chamber. In order to open the heating vessel, the eccentric lever 6 is swinging out, by what operation the cranked rod 4 together with the cover 2 and the burner are lifted so far, until the heat shield 7 and the burning tube are above the upper edge of the heating vessel. The eccentric lever 6 is thus shaped such, that its curved path terminates in a plane face 8 at the point most remote from the pivot center of the eccentric lever, on which plane face 8 the cranked rod 4 rests in its lifted position as shown in FIG. 2. The eccentric lever 6 is thereby secured against turning back and the cranked rod 4 as well as the cover 2 and the burner are retained in their lifted position. By reason of the bearing of the cover 2 in two turning centers caused by the cranked shape of the rod 4, the cover 2 together with the burner can now be moved in an almost straight direction forwardly from the opened narrow forward-front of the vessel housing indicated in dashed lines in FIGS. 3 and 4.

While I have disclosed one embodiment of the present invention, it is to be understood that this embodiment is given by example only and not in a limiting sense.

I claim:

1. A heating vessel with a vertical, substantially cylindrically shaped water jacket, comprising
    a cover arranged on the upper side of said water jacket and adapted to carry a burner projecting into a combustion chamber surrounded by said water jacket,
    a vertical crank-like rod carrying said cover pivotally about a first vertical axis, at the upper end of said rod,
    a support means arranged on the outer side of said heating vessel bearing at its lower end said crank-like rod swingably about a second vertical axis and displaceably in the direction of said second vertical axis,
    an eccentric lever lifting said crank-like rod by cooperation between the lower end of said rod and said eccentric lever in said support means,
    said eccentric lever having a curved path, and said curved path including a plane face supporting said crank-like rod in its lifted position.

* * * * *